US012294849B2

(12) United States Patent
Connolly et al.

(10) Patent No.: US 12,294,849 B2
(45) Date of Patent: May 6, 2025

(54) AUDIO LEVEL METERING FOR LISTENER POSITION AND OBJECT POSITION

(71) Applicant: Apple Inc., Cupertino, CA (US)

(72) Inventors: Matthew S. Connolly, San Jose, CA (US); Jared King, Hermosa Beach, CA (US)

(73) Assignee: Apple Inc., Cupertino, CA (US)

( * ) Notice: Subject to any disclaimer, the term of this patent is extended or adjusted under 35 U.S.C. 154(b) by 221 days.

(21) Appl. No.: 17/703,350

(22) Filed: Mar. 24, 2022

(65) Prior Publication Data

US 2022/0345843 A1 Oct. 27, 2022

Related U.S. Application Data

(60) Provisional application No. 63/180,354, filed on Apr. 27, 2021.

(51) Int. Cl.

*H04S 7/00* (2006.01)
*H04R 29/00* (2006.01)
*H04S 3/00* (2006.01)

(52) U.S. Cl.

CPC .......... *H04S 7/303* (2013.01); *H04R 29/008* (2013.01); *H04S 3/008* (2013.01); *H04S 2400/01* (2013.01); *H04S 2400/13* (2013.01)

(58) Field of Classification Search

CPC ...... H04S 7/303; H04S 3/008; H04S 2400/01; H04S 2400/13; H04R 29/008

See application file for complete search history.

(56) References Cited

U.S. PATENT DOCUMENTS

2011/0081023 A1 4/2011 Raghuvanshi et al.
2012/0070011 A1 3/2012 Van Baelen et al.
2017/0374465 A1 12/2017 Family et al.
2019/0104375 A1 4/2019 Laaksonen

OTHER PUBLICATIONS

AFMG® Ahnert Feistel Media Group The creators of Ease®, Easera, Sys Tune www.afmg.eu; "Ease Focus Version 3 User Guide"; Feb. 2019.*

Audiodraft; "Audio Levels 101—All you need is LUFS"; Mar. 3, 2016.*

Jensen, Mads Herring, "Modeling Room Acoustics with Comsol Multiphysics," Comsol Blog, <https://www.comsol.com/blogs/modeling-room-acoustics-with-comsol-multiphysics/>, Feb. 25, 2015, 7 pages.

"Mapp XT System Design Tool," Meyer Sound, retrieved from the Internet on Jan. 26, 2021, <https://meyersound.com/product/mapp-xt/>, 3 pages.

Thornton, Mike, "Hidden Keyboard Shortcuts in Pro Tools," Pro Tools, Oct. 17, 2015, retrieved from the Internet <https://www.pro-tools-exper.com/home-page/2012/3/16/hidden-keyboard-shortcuts-in-pro-tools.html>, 5 pages.

(Continued)

*Primary Examiner* — David L Ton
(74) *Attorney, Agent, or Firm* — Aikin & Gallant, LLP

(57) ABSTRACT

Playback of an audio signal is simulated from a playback position to a listening position. The simulation is performed with respect to a model of a listening area. The resulting loudness of the audio, perceived at the listening position, is rendered to a display. Other aspects are described and claimed.

20 Claims, 7 Drawing Sheets

(56) References Cited

OTHER PUBLICATIONS

"Room Analyzer," XTZ—Room Analyzer II Pro—Measurement Systems, retrieved from the Internet on Jan. 26, 2021, <https://www.xtzsound.eu/product/room-analyzer-ii-pro>, 6 pages.
"Insight 2 Sound Field," Izotope, retrieved from the Internet on Jan. 26, 2021, <https://www.izotope.com/en/products/insight/features/sound-field.html>, 4 pages.
"Ease Focus 3—Universal Sound System Modeling in 3D," AFMG, retrieved from the Internet on Mar. 23, 2022, <afmg.eu/en/ease-focus>, 3 pages.

* cited by examiner

AUDIO LEVEL METERING FOR LISTENER POSITION AND OBJECT POSITION

CROSS-REFERENCE TO RELATED APPLICATION

This application claims the benefit of U.S. Provisional Patent Application No. 63/180,354 filed Apr. 27, 2021, which is incorporated by reference herein in its entirety.

FIELD

One aspect of the disclosure relates to audio level metering.

BACKGROUND

Humans can estimate the location of a sound by analyzing the sounds at their two ears. This is known as binaural hearing and the human auditory system can estimate directions of sound using the way sound diffracts around and reflects off of our bodies and interacts with our pinna. These spatial cues can be artificially generated using spatial filters.

Audio can be rendered for playback with spatial filters so that the audio is perceived to have spatial qualities, for example, originating from a location above, below, or to a side of a listener. The spatial filters can artificially impart spatial cues into the audio that resemble the diffractions, delays, and reflections that are naturally caused by our body geometry and pinna. The spatially filtered audio can be produced by a spatial audio reproduction system (a renderer) and output through speakers (e.g., on headphones).

In a spatial audio environment, a position of a sound source and/or a listener can vary. A sound that is farther away from a listener can be played less loud than if that same sound is closer to the listener. This imitates reality because acoustic energy is attenuated as it travels a distance. As such, sound pressure level (SPL) of a sound naturally decreases when the distance that a sound travels is increased.

SUMMARY

In some aspects of the present disclosure, a method for producing an audio level meter can provide loudness with respect to varying listener and sound source positions. An audio signal is received for measuring. Playback of the audio signal is simulated. The playback is simulated based on a playback position of the audio signal from the point of view of a listening position, both of which are in a model of a listening area. As a result, a loudness of the playback of the audio signal is determined, as being perceived by a listener at the listening position is determined.

The perceived loudness can be influenced by acoustic properties as defined by the model of the listening area. Such acoustic properties can include a room geometry, reverberation, acoustic damping of surfaces, furniture and other objects (e.g., furniture, people, etc.) in the listening area. For example, a small room can have different reverberation qualities than a large room, and likewise for an open space. Soft surface materials can absorb acoustic energy more than hard surface materials. A room with furniture will sound different from a room without furniture. As such, the model of the listening area can define the different parameters of the listening area, as well as a room geometry, if the sound source (the playback position of the audio signal) is intended to sound as if it is located in a room.

The perceived loudness can be rendered on a display, thereby indicating to a user what the loudness of an audio signal at a particular listening position in the listening area. The display can be standard computer monitor, a display of a tablet computer, phone, or other mobile electronic device, a heads-up display, a touchscreen display, and/or other known display types.

In such a manner, a user can author a three-dimensional audio or audio-visual experience and see whether the placement of sound sources or listening positions are ideal (not too loud or too quiet). The loudness is shown on a level meter, which can provide guidance to a user when creating the audio or audiovisual work. The user can then modify the placements, and/or increase or reduce the level of the audio signal during the creation process. The resulting audio or audio-visual work can be produced with an improved understanding of how the loudness of a sound source will be perceived by a listener, even as their positions may change during playback.

In some aspects, an audio system with one or more processors and a display can perform such a process as described above. The audio system can be integral to an audio or audio-visual production tool (e.g., a plug-in) such as, for example, a digital audio work stations (DAWS), a 3D media developer tool, a videogame developer/editor, a movie editor, and/or other content creation tools so as to provide a user with an improved audio level meter that accounts for position of the sound source, a listener, and/or the listening environment. Thus, each audio signal can be perceived by a listener at a position (or zone around the position) in a controlled manner. In some aspects, the audio system is a stand-alone tool. As a stand-alone tool, the system can receive inputs generated by other tools and/or from a user, specifying sound source position, user position, and a model of the listening area.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to “an” or “one” aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required fora given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, algorithms, structures, and techniques have not been shown in detail so as not to obscure the understanding of this description.

Audio level metering measures the loudness of an audio signal. Audio level metering of an audio signal is traditionally performed at different stages of an audio production process, but in a static manner that does not account for a virtual (computer-generated) playback environment, playback position, or listener position.

Figure 1:
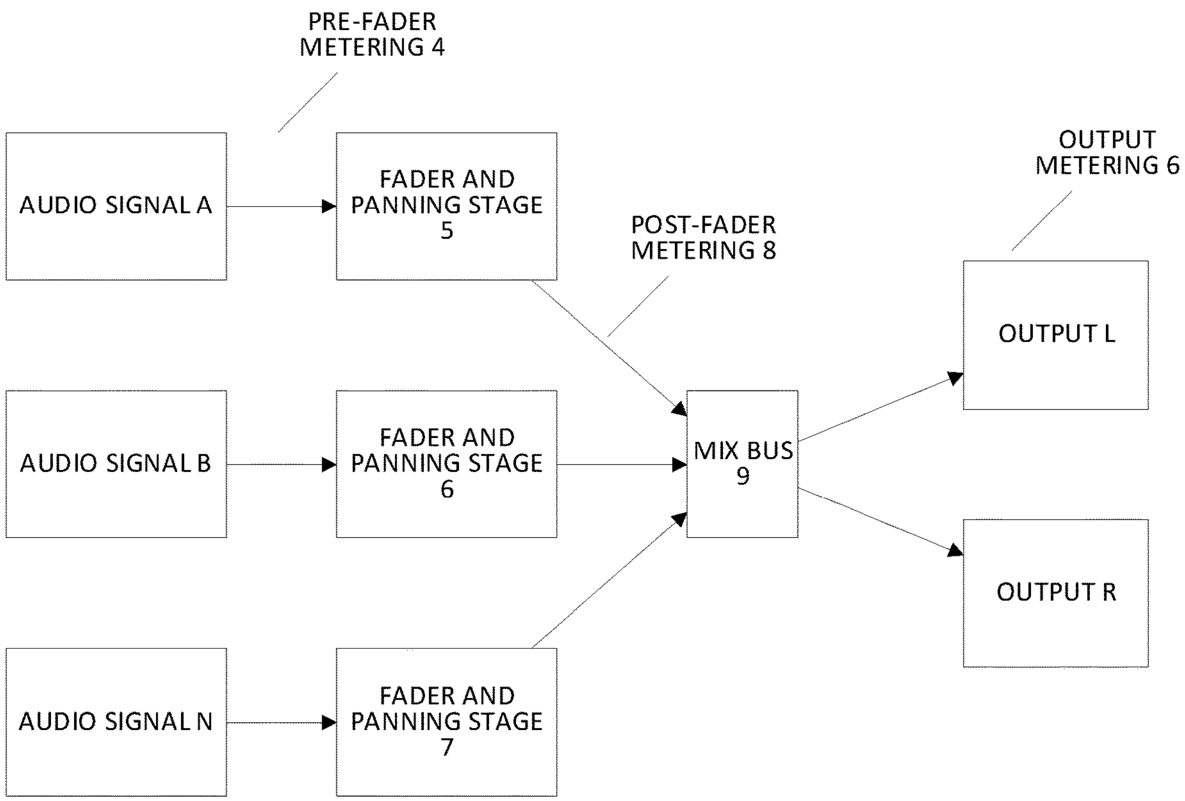
FIG. 1 shows an audio production process with metering.

FIG. 1 shows an example audio production process with metering. Audio production can include a one or more audio signals A-N. Depending on the format of the audio or audiovisual work, an audio signal can be an audio channel that is dedicated to a speaker (e.g., a front left speaker of a surround sound format). If the audio or audiovisual work has an object-based audio format, each audio signal can represent sound produced by an 'object'.

Generally, levels of audio signals A-C can each be measured individually at pre-fader metering 4, prior to a fader and panning stages 5-7. The levels can be measured again at post-fader metering 8. A mix bus 9 can mix the audio signals together according to an output format (in this case stereo). The output levels of the mix bus can be measured again, individually, at output metering 6. Although this example shows audio signals being mixed to two-channel stereo, different output formats are possible such as 5.1, 7.1.4, or object-based audio such as, for example, Dolby Atmos or MPEG-H.

As such, levels of the audio signals can be measured at different stages to help a content creator determine if the levels fall within a predetermined listening range (e.g., one that is comfortable, safe, and/or audible to a human listener). Such meters do not, however, describe audio levels with respect to varying listener position and/or varying sound source position. For example, a user can produce an audio work while measuring the audio signal at the different stages described above. Such measurements alone, however, fail to indicate to the user what the level of the audio signal is during playback with respect to the listener position or with respect to the listening environment.

Sound pressure levels decrease with distance. Nominally, the relationship between distance and sound is $1/r^2$. This relationship describes how sound pressure level is attenuated based on the distance that the sound travels from the source to the listener. As such, the sound intensity, loudness, or SPL, decreases inversely proportional to the squared distance that the sound travels. This distance can be measured from the sound source. A doubling of the distance deceases the sound intensity to a quarter of its initial value.

Additionally, in a typical listening environment such as a room, there is additional energy present caused by acoustic energy reflection off the walls, as well as off of objects (e.g., furniture, other people) in a room. This acoustic energy is typically described as early reflections and late reflections (e.g., reverb). The behavior of the acoustic reflections can differ based on room geometry such as the size and shape of the room. Further, the behavior of the reflections can be different at different frequencies (even in the same listening area) resulting in different distance attenuation curves at different frequencies.

Therefore, the acoustic effects of a listening area and relative position between sound source and listener can drastically impact the perceived loudness of a sound source. If the listener position is different from what the audio work was designed for, or if the listener position changes dynamically during playback, the loudness of the audio signal perceived by the listener may be uncomfortably loud or too soft to hear.

Further, in some extended reality (XR) environments, the sound source position and listener position can also change dynamically. Extended reality includes augmented reality, virtual reality, mixed reality, or other immersive technologies that merge the physical and virtual (computer-generated) worlds. Thus, there is a need to indicate to a user, during production of the audio work, a perceived loudness that varies depending on sound source position, the listener position, and the listening environment. The user can then adjust the level of an audio signal, the listener position, the source position, and/or the listening environment, based on the level meter readings. The adjustments can be performed during production, rather than learning about undesirable levels after the completion of an audio or audiovisual work.

Figure 2:
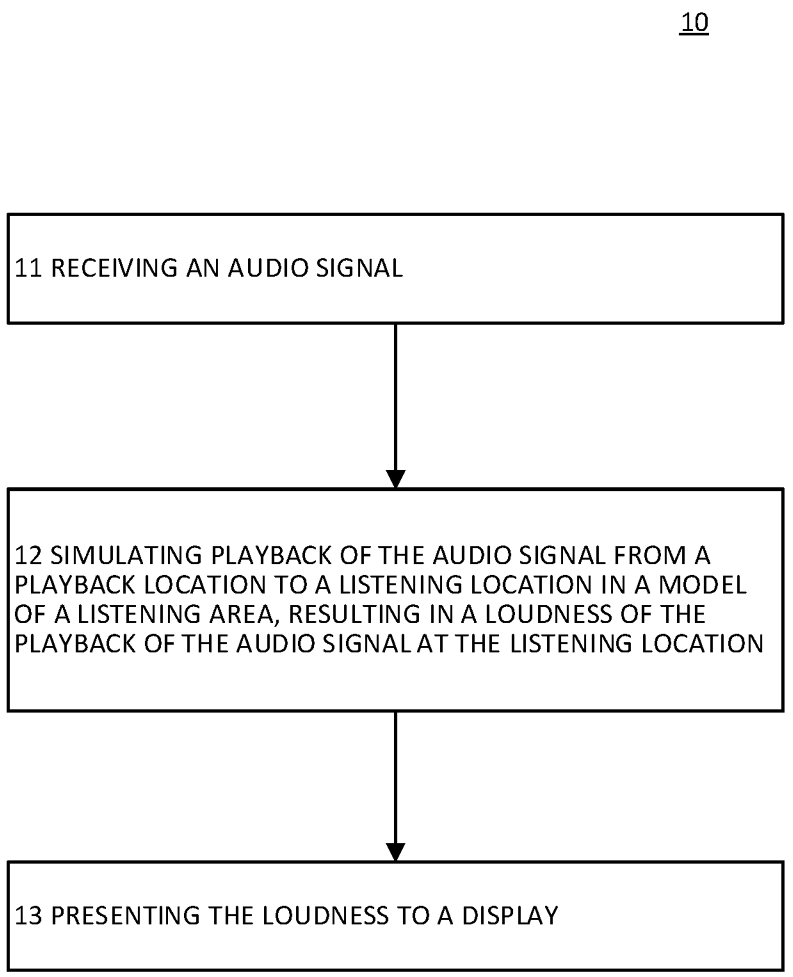
FIG. 2 shows a method for metering, according to some aspects.

FIG. 2 shows a method 10 for providing a level of an audio signal, according to some aspects. At operation 11, the method includes receiving an audio signal. Depending on the formatting of the audio or audio-visual work, the audio signal can be associated with an object of an object-based audio format such as, for example, Dolby Atmos or MPEG-H. In other aspects, the audio signal can be an audio channel that corresponds to a speaker of a multi-speaker output format (e.g., 5.1, 7.2, etc.). And audio or audio-visual work can include movies, XR media, videogames, teleconferencing applications, songs, and more.

At operation 12, the method includes simulating playback of the audio signal from a playback position to a listening position in a model of a listening area. The simulation results in a loudness of the playback of the audio signal that would be perceived at the listening position. The loudness can be expressed as a loudness K-weighted full scale loudness (LKFS), a root-mean squared (RMS) loudness, a peak loudness, or other measure of loudness that reflects a sound pressure level (SPL) as perceived by a listener. The loudness can be expressed in decibels (dB).

At operation 13, the loudness is presented (as a computer graphic or animation) to a display. In some aspects, the loudness is presented as a line or bar, such as, for example, those shown in the meter of FIGS. 3-5. Additionally, or alternatively, the loudness can be presented as a numeric value, such as shown in FIG. 9. The meter/loudness can be presented in different ways without departing from the scope of the present disclosure. In some examples, the loudness or loudness range (e.g., a minimum loudness, or a maximum loudness) may be displayed relative to a frequency of the audio signal. Multiple loudnesses or loudness ranges may be displayed for various frequency bands of the audio signal. The loudness of one frequency component may be different than another frequency component in the same audio signal at a given position.

It should be understood that the method 10 can be repeated for one or more additional audio signals. For example, a sound scene of an object-based audio work can include an airplane flying overhead, a dog barking to the right, and a person speaking in front of the listener position. In a multi-speaker format, the different audio signals can represent different speaker channels. Regardless of audio format, each audio signal can be associated with a different playback location. Thus, the method can be repeated for each of the one or more additional audio signals at respective playback locations, relative to the listener position (and/or other listener positions) in the listening area. A position of a sound source or listener can include its location (e.g., in 2D or 3D coordinates) and orientation (e.g., spherical coordinates).

Figure 3:
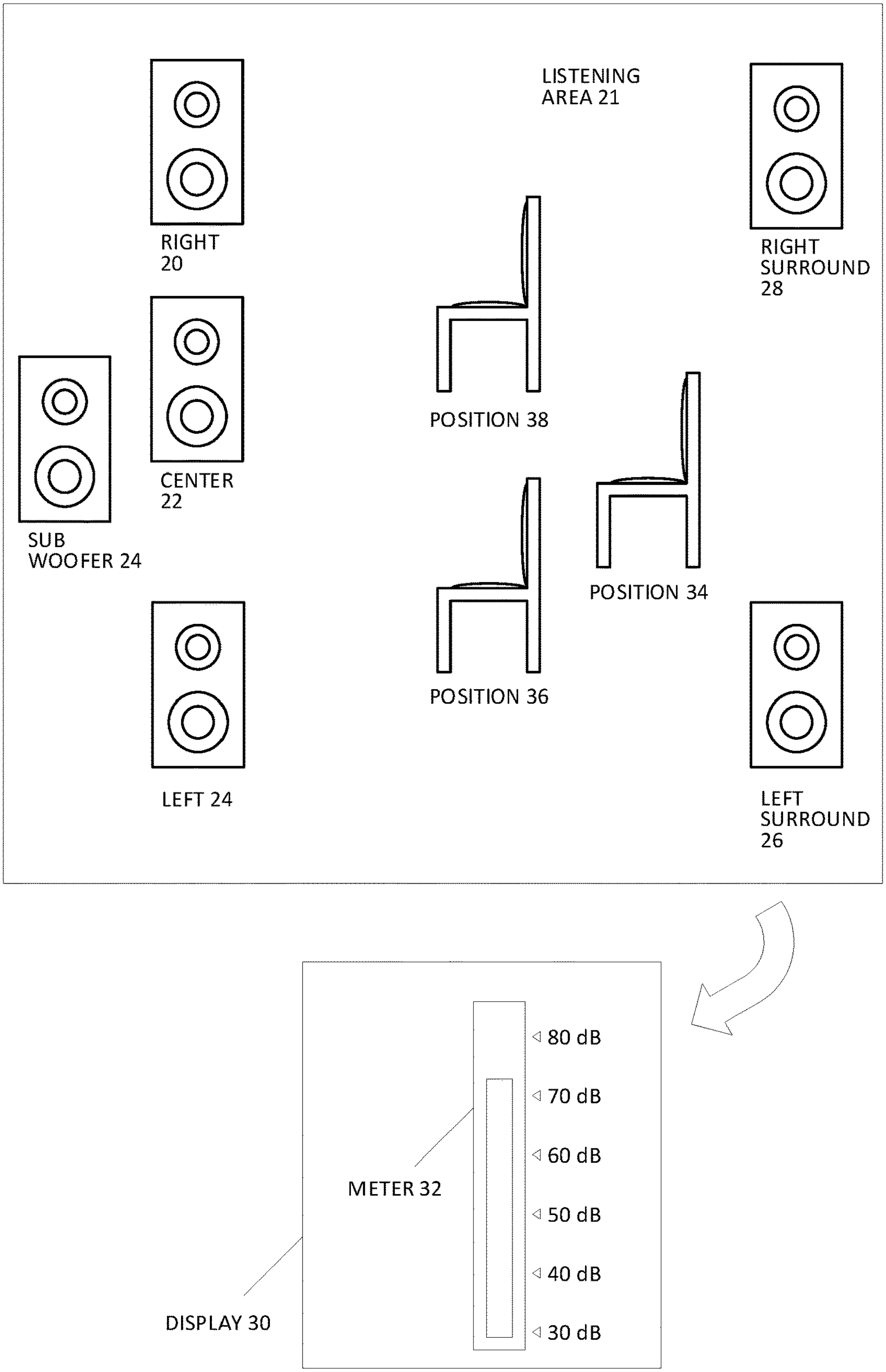
FIG. 3 shows an example audio meter with known sound source locations, according to some aspects.

FIGS. 3 shows an example audio meter with known sound source locations, according to some aspects. Audio mixes can be played back on physical speakers. The amplification of the physical speakers can be calibrated for an optimal listening position and/or average levels across a range of seats. Different surround sound speaker formats have predefined optimal speaker locations.

For example, with a surround sound speaker format (e.g., 5.1, 7.2, etc.), optimal speaker locations for a right speaker 20, a center speaker 22, a left speaker 24, a sub-woofer 24, a right surround speaker 28, and a left surround speaker 26 are known or pre-defined. Amplification (e.g., gain values) of each audio channel that drives respective speakers can be defined for an optimal listening position (e.g., listening position 34). Other listening positions (e.g., 38 and 36) would then be subject to speaker output that has been tailored to position 34, and thus, they would be less than optimal. For example, position 38 is closer to right speaker 20 and further from left surround speaker 26, relative to position 34. Thus, the right speaker 20 may sound stronger, and the left surround speaker 26 may sound weaker, for position 38 than for position 34. A meter 32 can be presented to a content producer on a display 30. The meter can show loudness at one of the listening positions. In some embodiments, a plurality of meters can be presented on the display, each meter showing a loudness of one of the listening positions. For example, a first meter can show loudness measured at position 34, a second meter can show loudness measured at position 36, and a third meter can show loudness measured at position 38. A content producer can analyze loudness levels of each speaker for multiple listening positions and adjust the levels accordingly. Loudness of each channel can be balanced for one or more listening positions.

Figure 4:
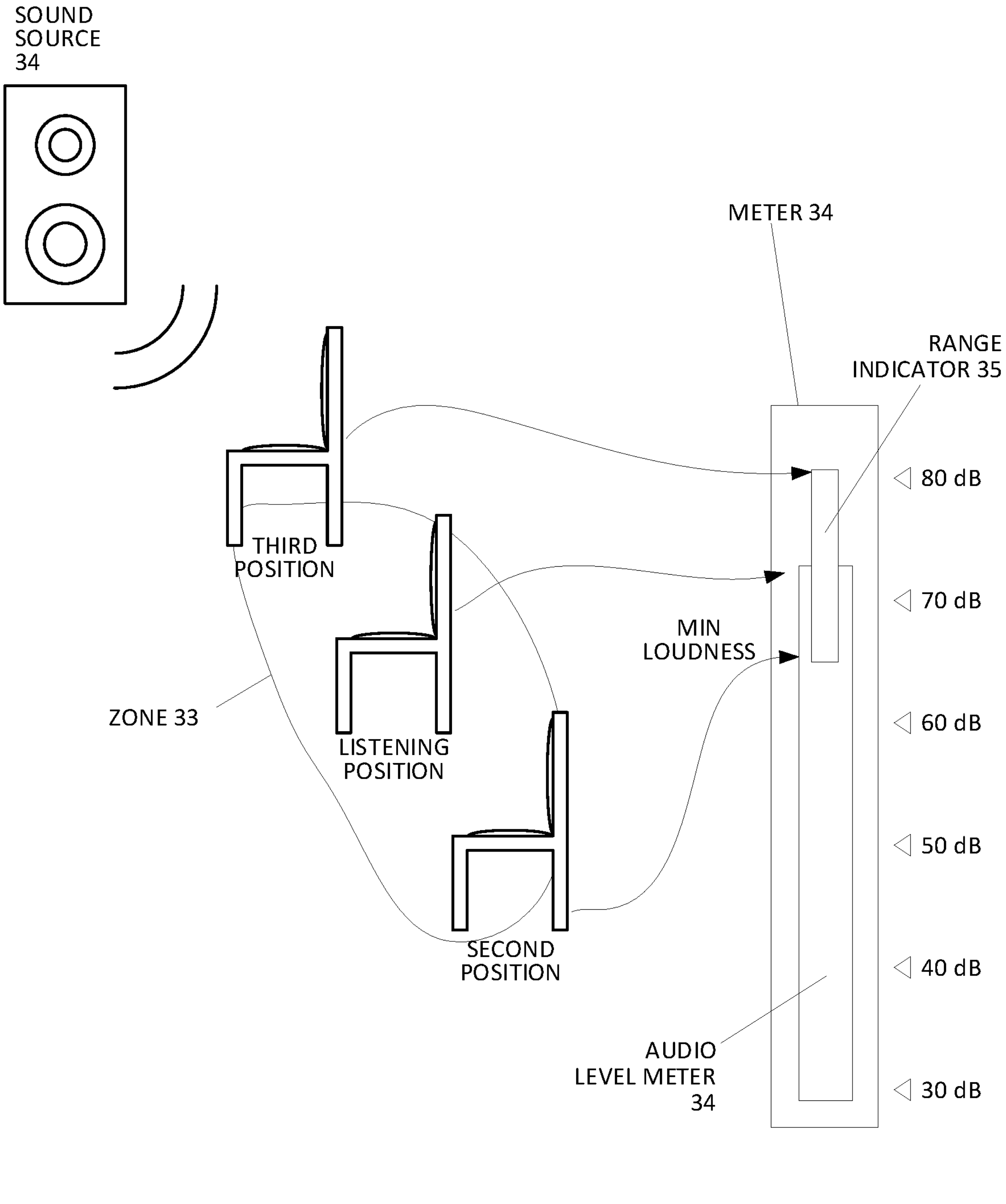
FIG. 4 shows an example audio meter with maximum and minimum loudness indication, according to some aspects.

FIG. 4 shows an example audio meter with maximum and/or minimum loudness indication, according to some aspects. An audio level meter 34 can show loudness of a sound source 34 at a defined listening position. A minimum loudness can be determined based on a second listening position. A maximum loudness can be determined based on a third listening position. The minimum loudness and/or the maximum loudness can be presented to a display. The maximum loudness and minimum loudness may show a loudness range that is shown relative to a range of listening positions. The audio meter may include or be integral to a graphical user interface (GUI) that takes user inputs (e.g., through a mouse, a touchscreen, a keypad, or other user input device).

In some aspects, a zone 33 can be defined around the listening position. The zone can be a circle, square, triangle, or irregular shape. The minimum loudness can represent a listening position in this zone where the sound source is the weakest. The maximum loudness can represent a listening position in this zone where the sound source is the strongest (e.g., loudest). In some examples, the audio meter may adjust the listening position, the second listening position and/or the third listening position in response to a change in a level of the playback of the audio signal. For example, the audio meter may be part of a user interface that receives user input that increases or decreases a level of the playback of the audio signal. The second listening position and/or the third listening position may automatically adjust in response to the change in level. For example, if the level increases, the second and third position may move farther away from the sound source 34. Similarly, if the level is decreased, the second and third position may move closer to the sound source 34. More generally, the audio meter may determine a one or more loudnesses as they would be perceived at various different listening positions and display these loudnesses simultaneously. For example, the audio meter may obtain user input that specifies a plurality of different listening positions in a given listening area. The audio meter may simulate the playback of the audio signal at each of the different listening positions, and present each of the loudnesses to the display. Further, the audio meter may obtain user input that adjusts any of the listening positions. In response to the user input, the audio meter may adjust the loudness according to the adjusted listening position. Further, the audio meter may obtain user input that adjusts a level of the signal. In response to the user input, the audio meter may adjust any or all of the listening positions according to the adjusted level of the signal, as discussed. Further, the audio meter may determine a range (e.g., a maximum and minimum loudness and corresponding listening positions) for each of the listening positions. As such, a user may audition and compare different listening positions using the audio meter with respect to a given audio signal. The audio meter may dynamically adjust one or more listening positions or loudness thereof, based on a level of the audio signal or frequency content of the audio signal.

In some aspects, the loudness of the sound source at the listening position is indicated with a line or bar. The length of the bar indicates the loudness of the audio signal. In some aspects, the minimum loudness and the maximum loudness are presented as a second bar or line that has a start based on the minimum loudness and an end based on the maximum loudness.

For example, the range indicator 35 starts at the minimum loudness (e.g., 65 dB) and ends at the maximum loudness (e.g., 80 db). As such, the meter shows the listening position loudness, as well as a range of loudness as heard by positions around the listening position. Such a meter can show the level at which an audio signal would be perceived by a listener at a given position, and max/min levels in a given zone around the listener. Thus, a user (e.g., a content creator) will not be surprised by loudness of content when a listener changes position during playback in a surround sound speaker environment or by the loudness of content heard by listeners at various locations within an intended listening zone 33.

In some aspects, the meter can indicate the range based on the frequency content of the signal being measured. For example, different levels or range of levels can be shown for one or more frequencies or frequency bands.

Figure 5:
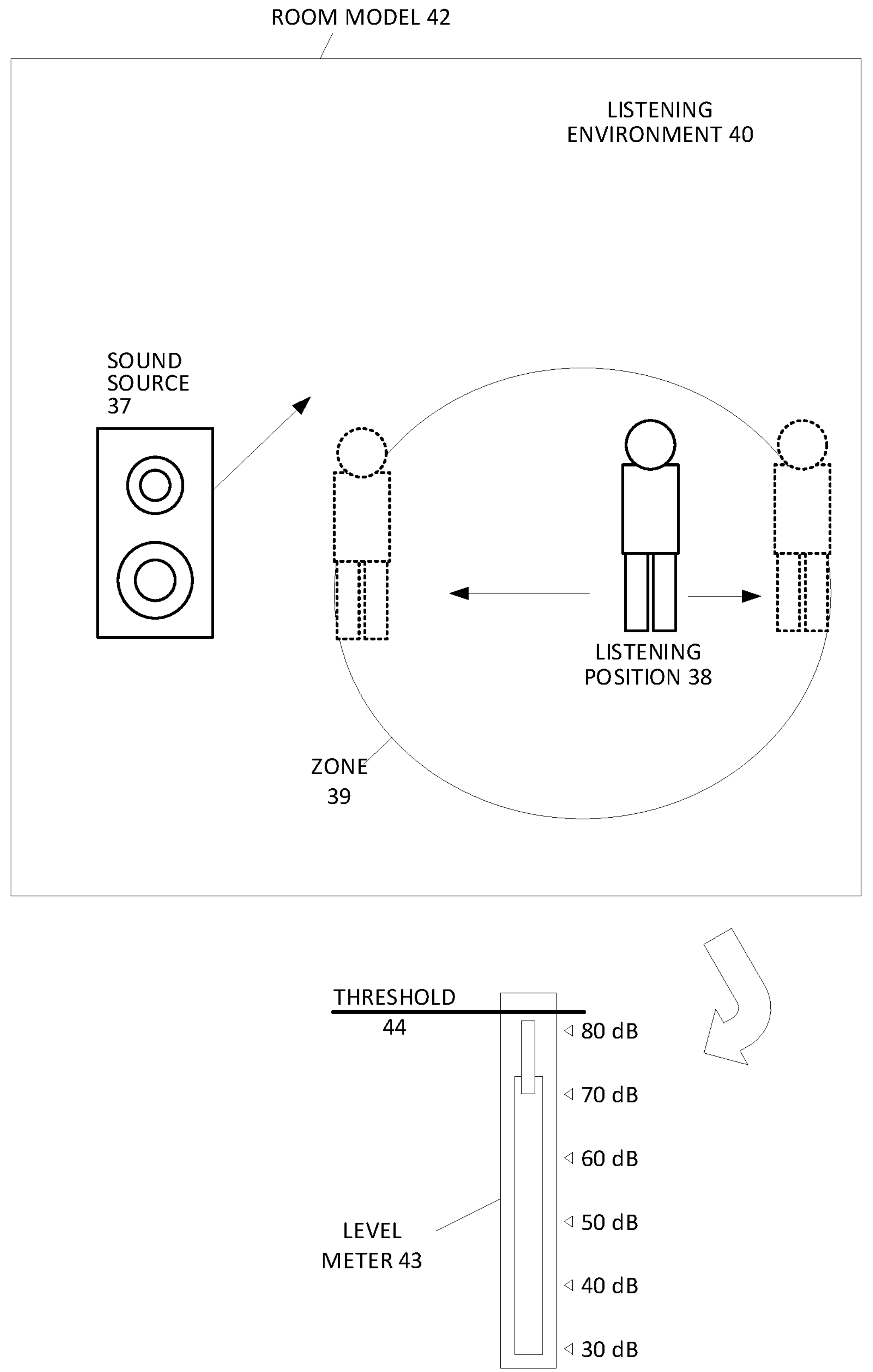
FIG. 5 shows an example audio meter with varying listener and sound source positions, according to some aspects.

FIG. 5 shows an example audio meter with varying listener and sound source positions, according to some aspects. In a spatial audio environment, one or more sound sources are spatially filtered to give the appearance that sounds are emanating at locations around the listener. These sound sources (e.g., sound source 37) can change position overtime. For example, an audio work may include a sound that moves from left to right of a listener. As such, the loudness of the sound source as perceived by a listener at a listener position 38 can change over time.

Further, in an immersive environment such extended reality (XR), the listener position can also change overtime. For example, a listener's head position can be tracked using sensors (e.g., a camera, gyroscope and/or accelerometers) with tracking algorithms (e.g., visual odometry, SLAM). The level of a sound source that as perceived by a listener is dynamic. The level can depend on the relative positions of the sound source and the listener, the listener environment 40, and the audio signal associated with the sound source. Thus, a content creator can 'move' hypothetical sound source positions or listener positions around with a 3D content creation tool such as, for example, Unity, Unreal Engine, CRYENGINE, or other equivalent technology. In response, a level meter 43 can be presented to show the level at the listening position 38, and/or a max/min level with respect to a zone 39 around the listening position. The content creator can see these levels during production and make necessary adjustments during production, instead of making corrections after completion. The content creator can adjust different parameters such as, for example, the positions of the sound source and/or the listener, amplification (e.g., a gain) that is associated with the sound source, and/or a model of the listening environment.

The model of the listening area can include a geometrical definition of the listening area. If the listening area is in a room (e.g., a virtual room), then the model of the listening area can include a room model 42. A room model can include room shape, length and width of walls, and/or overall volume. The room model can include surface materials present in the listening area (e.g., cloth, stone, carpet, cement, hardwood, etc.), an acoustic attenuation coefficient (describing absorption or scattering of sound through a propagation path), a sound absorption coefficient, a reverberation time, and/or objects in the listening area. The room model can include a CAD model of the room or other computer defined 3D model. The room model can include objects such as doorways, furniture, and/or other people, located in the room.

In some aspects, one or more parameters such as sound source position, listening position, model of listening environment, and/or level of audio signal can be adjusted automatically based on a desired perceived loudness of the playback of the audio signal at the listening position. The threshold can represent a max level and/or a min level. The adjustment can be made to maintain the level below the max level and/or above a min level.

For example, a loudness of the audio signal that is associated with the sound source 37 can be adjusted by the system automatically if the perceived loudness of the playback of the audio signal at the listening position satisfies a threshold (e.g., 44). The sound source can be moved farther away from the listener to reduce the loudness, or it can be moved toward the listening position, to increase the loudness.

Additionally, or alternatively, the listener position can be automatically adjusted if the loudness of the playback of the audio signal at the listening position satisfies a threshold. The listener position can be moved farther away from the sound source to reduce the loudness, or moved toward the sound source to increase the loudness.

Additionally, or alternatively, the model of the listening environment (e.g., the room model) can be adjusted if the perceived loudness of the playback of the audio signal at the listening position satisfies a threshold. For example, the room can be made larger to reduce the loudness caused by reflections, or the room can be made smaller to increase the loudness caused by reflections. Sound absorption and/or acoustic attenuation coefficients can be increased or reduced to reduce or increase loudness caused by reflections.

Settings, which can be configured by default and/or modified by a user, can control whether or not automatic adjustment will be performed by the system. Additionally, or alternatively, the settings can determine which of the parameters should be adjusted automatically in response to the threshold being satisfied. In some aspects, the settings can define a hierarchy, for example, first adjust the sound source position, then the listening environment, then the gain associated with the audio signal, and then the listening position.

Figure 6:
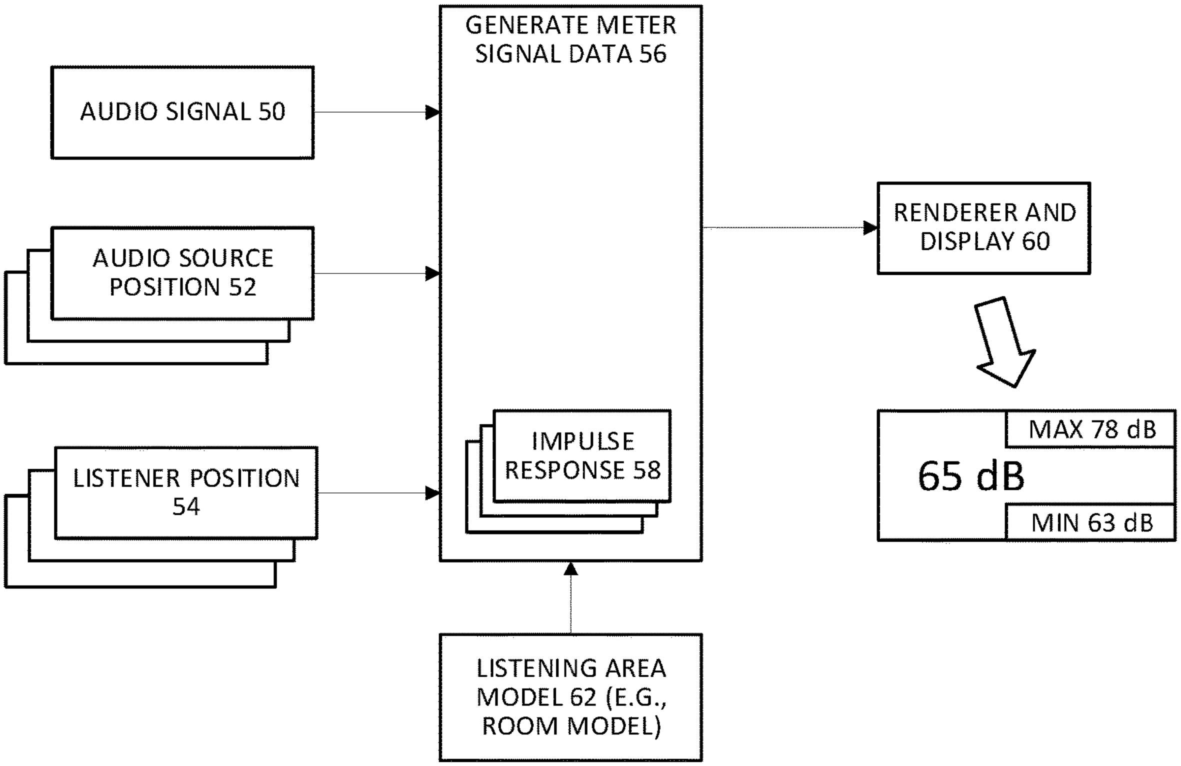
FIG. 6 shows an audio system for generating an audio meter on display, according to some aspects.

FIG. 6 shows an audio system for generating an audio meter to a display, according to some aspects. The audio system can perform operations and methods described herein, such as method 10 described with respect to FIG. 2.

An audio signal 50 represents audio of a sound source or an audio channel used to drive a speaker. The audio signal can be one or more audio signals that are each part of a common audio or audio-visual work. The audio signal can vary over time and over frequency bands. The audio signal can be a time domain or frequency domain (e.g., STFT) audio signal.

A meter signal data generator 56 can determine or select an appropriate impulse response 58 based on the position 52 of the sound source relative to the position 54 of the listener. Each impulse response, when applied to the audio signal, cab impart spatial cues (e.g., frequency dependent gains and delays) to the audio signal that simulates how the human body and earshape audio—thus simulating natural physics when sound waves propagate from a sound source to the human ear. The impulse response can include one or more room impulse responses that be determined or selected based on the model 62 of the listening area.

For example, the room impulse responses can mimic a small room, a large room, a concert hall, an open field, etc., by characterizing the acoustic energy caused by reflections and/or scattering of sound in a respective environment. The impulse response is determined or selected to incorporate into the audio signal, how sound from the playback position is perceived at listening position with respect to the model of the listening area. The audio signal can be convolved with the impulse response to simulate playback of the audio signal at the listening position, and including the acoustic characteristics (e.g., the early and late acoustic reflections) of the listening area.

The model of the listening area can be stored as metadata that describes reverberation time, scattering parameters, absorption parameters, surface materials, and/or a full geometric model of the listening area.

The meter signal data generator can measure the resulting audio signal to determine its level and/or a range of levels at the listening position. As discussed, the audio source position 52 can be one or more audio source positions. Similarly, the listener position can be one or more listener positions. For each different position of the audio source relative to the listener, a respective impulse response can be determined that models how sound travels (directly and/or indirectly) from the source to the listener.

The meter signal provides the level or levels to the renderer and display 60. The renderer and display can produce one or more graphics that represent a level meter.

The level meter can present the loudness at a listening position and/or a range of loudness using a visual indication that can include one or more shapes (e.g., bars, needles, circles, graphs, etc.), symbols (e.g., numbers, letters, etc.), and/or other visual indicators. In some aspects, the visual indicator can indicate loudness based on color, light intensity, or combinations thereof. In some aspects, as shown, the level meter can be shown as symbols (e.g., a numeric value). In some aspects, the level meter can be presented as a rotating needle. For example, a needle can rotate about a pivot to point to loudness values. Other visual shapes or symbols can be rendered indicating the audio level without departing from the scope of the disclosure. The renderer and display can include various electronic display systems, as described in other sections.

Figure 7:
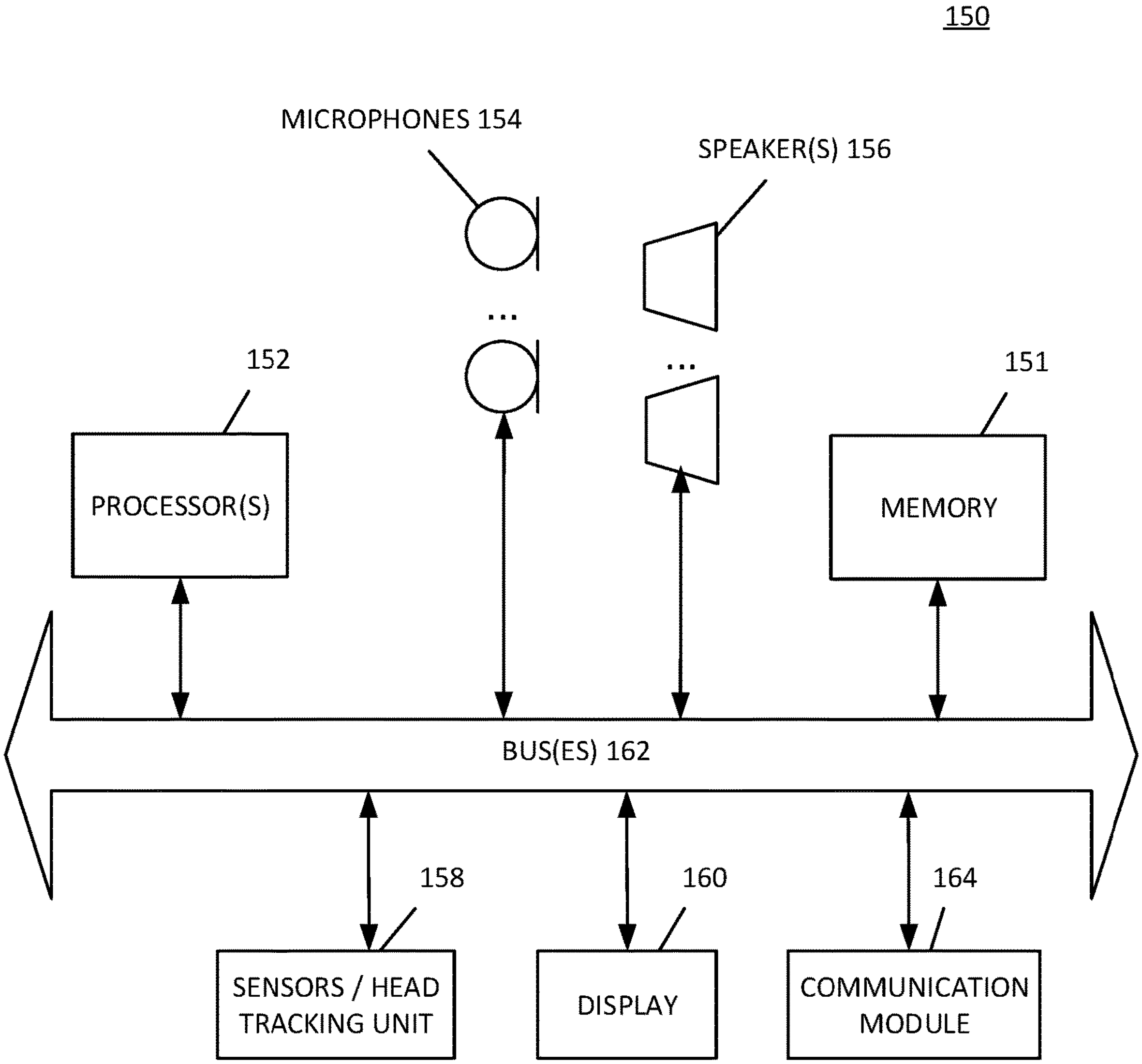
FIG. 7 shows an example of hardware of an audio system, according to some aspects.

FIG. 7 shows an example of an audio processing system 150 according to some aspects. The audio processing system can be a computing device such as, for example, a desktop computer, a tablet computer, a smart phone, a computer laptop, a smart speaker, a media player, a headphone, a head mounted display (HMD), smart glasses, an infotainment system for an automobile or other vehicle, or an electronic device configured to present XR. The system can be configured to perform the method and processes described in the present disclosure. In some aspects, systems such as those shown in FIG. 6 are implemented as one or more audio processing systems.

Although various components of an audio processing system are shown that may be incorporated into headphones, speaker systems, microphone arrays and entertainment systems, this illustration is merely one example of a particular implementation of the types of components that may be present in the audio processing system. This example is not intended to represent any particular architecture or manner of interconnecting the components as such details are not germane to the aspects herein. It will also be appreciated that other types of audio processing systems that have fewer or more components than shown can also be used. Accordingly, the processes described herein are not limited to use with the hardware and software shown.

The audio processing system 150 can include one or more buses 162 that serve to interconnect the various components of the system. One or more processors 152 are coupled to bus 162 as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 151 can include Read Only Memory (ROM), volatile memory, and non-volatile memory, or combinations thereof, coupled to the bus using techniques known in the art. Sensors/head tracking unit 158 can include an IMU and/or one or more cameras (e.g., RGB camera, RGBD camera, depth camera, etc.) or other sensors described herein. The audio processing system can further include a display 160 (e.g., an HMD, or touchscreen display).

Memory 151 can be connected to the bus and can include DRAM, a hard disk drive or a flash memory or a magnetic optical drive or magnetic memory or an optical drive or other types of memory systems that maintain data even after power is removed from the system. In one aspect, the processor 152 retrieves computer program instructions stored in a machine readable storage medium (memory) and executes those instructions to perform methods and other operations described herein.

Audio hardware, although not shown, can be coupled to the one or more buses 162 in order to receive audio signals to be processed and output by speakers 156. Audio hardware can include digital to analog and/or analog to digital converters. Audio hardware can also include audio amplifiers and filters. The audio hardware can also interface with microphones 154 (e.g., microphone arrays) to receive audio signals (whether analog or digital), digitize them if necessary, and communicate the signals to the bus 162.

Communication module 164 can communicate with remote devices and networks. For example, communication module 164 can communicate over known technologies such as Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses 162 can be connected to each other through various bridges, controllers and/or adapters as is well known in the art. In one aspect, one or more network device(s) can be coupled to the bus 162. The network device(s) can be wired network devices (e.g., Ethernet) or wireless network devices (e.g., WI-FI, Bluetooth). In some aspects, various aspects described (e.g., simulation, analysis, estimation, modeling, object detection, etc.,) can be performed by a networked server in communication with the capture device.

Various aspects described herein may be embodied, at least in part, in software. That is, the techniques may be carried out in an audio processing system in response to its processor executing a sequence of instructions contained in a storage medium, such as a non-transitory machine-readable storage medium (e.g. DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms module, processor, unit, renderer, system, device, filter, sensor, display, and component, are representative of hardware and/or software configured to perform one or more processes or functions. For instance, examples of "hardware" include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it into be understood that such aspects are merely illustrative of and not restrictive on the broad invention, and the invention is not limited to the specific constructions and arrangements shown and described, since various other modifications may occur to those of ordinary skill in the art.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A computer-implemented method, comprising:

receiving an audio signal that is an audio channel corresponding to a speaker of a multi-speaker output format or is associated with a sound source object of an object-based audio format;

simulating playback of the audio signal from a playback position to a listening position in a model of a listening area, resulting in a loudness of the playback of the audio signal that would be perceived at the listening position; and presenting the loudness of the playback of the audio signal to a display.

2. The method of claim 1, wherein the loudness is presented as a line or bar that has a length that depends on the loudness.

3. The method of claim 1, further comprising determining a minimum loudness based on a second listening position, and a maximum loudness at a third listening position, and presenting the minimum loudness and the maximum loudness to the display.

4. The method of claim 3, wherein the loudness, the minimum loudness, or the maximum loudness are determined and presented relative to a frequency of the audio signal.

5. The method of claim 3, wherein the minimum loudness and the maximum loudness are presented as a second bar or line that has a start based on the minimum loudness and an end based on the maximum loudness.

6. The method of claim 5, further comprising adjusting the listening position, the second listening position or the third listening position in response to a change in a level of the playback of the audio signal.

7. The method of claim 1, wherein simulating playback includes convolving the audio signal with a room impulse response, the room impulse response incorporating how sound from the playback position is perceived at the listening position with respect to the model of the listening area.

8. The method of claim 1, wherein the model of the listening area includes a room geometry.

9. The method of claim 1, wherein the model of the listening area includes at least one of: surface materials, acoustic dampening coefficient, a reverberation time, or objects in the listening area.

10. The method of claim 1, wherein the loudness includes at least one of a Loudness K-weighted Full Scale (LKFS), a root mean squared (RMS) loudness, or a peak loudness.

11. An audio system, comprising:

a display; and a processor that is configured to perform:

receiving an audio signal that is an audio channel corresponding to a speaker of a multi-speaker output format or is associated with a sound source object as an object-based audio format;

simulating playback of the audio signal from a playback position to a listening position based on a model of a listening area, resulting in a loudness of the playback of the audio signal that would be perceived by a listener at the listening position; and rendering the loudness of the playback of the audio signal to the display.

12. The audio system of claim 11, wherein the processor is further configured to perform modifying a loudness of the audio signal if the loudness of the playback of the audio signal at the listening position satisfies a threshold.

13. The audio system of claim 11, wherein the processor is further configured to perform modifying a room geometry of the listening area if the loudness of the playback of the audio signal at the listening position satisfies a threshold.

14. The audio system of claim 11, wherein the processor is further configured to perform modifying the listening position if the loudness of the playback of the audio signal at the listening position satisfies a threshold.

15. A non-transitory machine readable medium storing instructions executable by one or more processors of an audio system to cause the audio system to perform a method comprising:

receiving an audio signal that is an audio channel corresponding to a speaker of a multi-speaker output format or is associated with a sound source object of an object-based audio format;

simulating playback of the audio signal from a playback position to a listening position in a model of a listening area, resulting in a loudness of the playback of the audio signal that would be perceived at the listening position; and presenting the loudness of the playback of the audio signal to a display.

16. The non-transitory machine readable medium of claim 15, wherein the loudness is presented as a numeric value.

17. The non-transitory machine readable medium of claim 15, wherein performance of the method is integrated as part of a digital audio work station (DAWS), a game developer application, or 3D media developer tool.

18. The non-transitory machine readable medium of claim 15, wherein the listening position or the playback position changes over time and the method is repeated for one or more additional audio signals.

19. The non-transitory machine readable medium of claim 15, wherein the method further comprises simulating playback of the audio signal from the playback position to one or more second listening positions, resulting in one or more second loudnesses of the playback of the audio signal that would be perceived at the one or more second listening positions, and presenting the one or more second loudnesses of the playback of the audio signal to the display.

20. The non-transitory machine readable medium of claim 19, wherein the playback position or the one or more second listening positions are determined or adjusted based on user input and the loudness or the one or more second loudnesses are updated based on adjustments to the playback position or the one or more second listening positions.

* * * * *